United States Patent [19]

Daggett et al.

[11] Patent Number: 4,876,494
[45] Date of Patent: Oct. 24, 1989

[54] POSITION AND VELOCITY FEEDBACK SYSTEM FOR A DIGITAL ROBOT CONTROL

[75] Inventors: Kenneth E. Daggett, Murrysville, Pa.; Eimei M. Onaga, Brookfield Center; Richard J. Casler, Jr., Newtown, both of Conn.

[73] Assignee: Unimation, Inc., Danbury, Conn.

[21] Appl. No.: 178,811

[22] Filed: Apr. 1, 1988

Related U.S. Application Data

[63] Continuation of Ser. No. 932,853, Nov. 20, 1986, abandoned.

[51] Int. Cl.⁴ .............................................. G05B 19/42
[52] U.S. Cl. .................................. 318/568.22; 318/567; 318/573; 364/513; 901/19; 901/20; 901/21; 901/23
[58] Field of Search ............... 318/563, 564, 565, 566, 318/567, 568 R, 568 L, 568 M, 572, 573, 574, 575, 576, 577, 634; 364/513, 167.01, 478; 901/19, 20, 21, 22, 23, 24

[56] References Cited

U.S. PATENT DOCUMENTS

| | | | |
|---|---|---|---|
| 3,836,833 | 9/1974 | Hanis et al. | 318/618 X |
| 3,969,663 | 7/1976 | Arthur | 318/618 X |
| 4,263,538 | 4/1981 | Richiardi | 318/568 C X |
| 4,288,731 | 9/1981 | Lee | 318/618 |
| 4,315,200 | 2/1982 | Yamada et al. | 318/603 |
| 4,329,721 | 5/1982 | Lee et al. | 318/618 X |
| 4,480,217 | 10/1984 | Robbins et al. | 318/618 |
| 4,491,776 | 1/1985 | Veale | 318/561 |
| 4,503,374 | 3/1985 | Sakane | 318/603 X |
| 4,523,135 | 6/1985 | Kogawa | 318/590 X |
| 4,578,749 | 3/1986 | Kuno et al. | 318/603 X |
| 4,599,545 | 7/1986 | Moriki et al. | 318/341 X |
| 4,602,345 | 7/1986 | Yokoyama | 364/513 |
| 4,647,826 | 3/1987 | Ota | 318/603 X |
| 4,682,089 | 7/1987 | Tamari | 318/568 |
| 4,683,543 | 7/1987 | Hirasawa et al. | 318/573 X |
| 4,698,777 | 10/1987 | Toyoda et al. | 901/14 X |
| 4,718,078 | 1/1988 | Bleidorn et al. | 318/563 X |
| 4,764,883 | 8/1988 | Nakagawa et al. | 364/513 |

Primary Examiner—William M. Shoop, Jr.
Assistant Examiner—Paul Ip
Attorney, Agent, or Firm—J. L. Brzuszek

[57] ABSTRACT

A digital position and velocity feedback system is provided for a multiaxis robot control and it employs an LSI chip to process incremental position signals for position change and velocity computations. At low speeds, velocity is computed from the reciprocal of elasped time. At higher speeds, velocity is computed from the rate at which incremental position signals are generated.

16 Claims, 17 Drawing Sheets

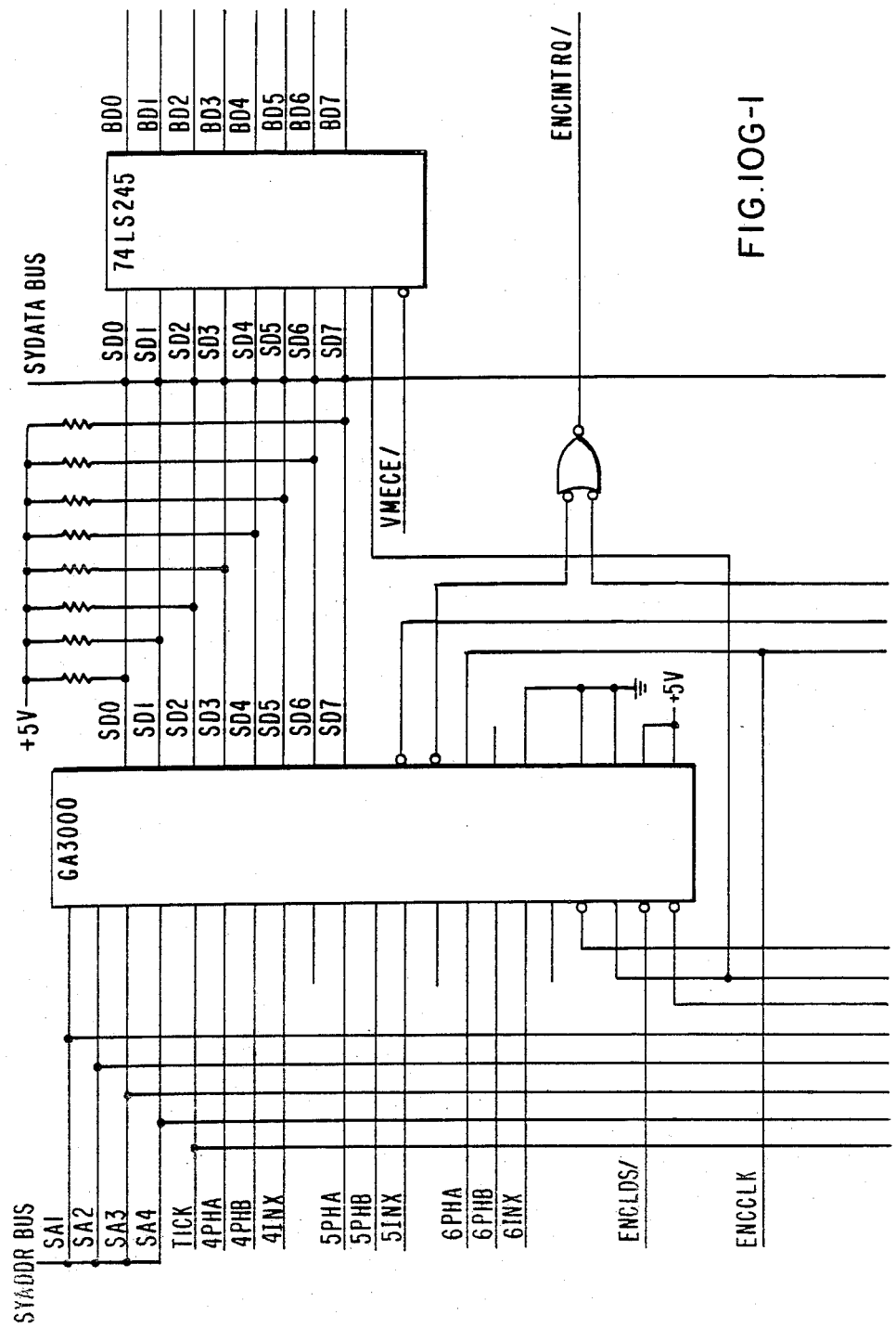

POSITION AND VELOCITY FEEDBACK SYSTEM FOR A DIGITAL ROBOT CONTROL

This application is a continuation of application Ser. No. 06/932,853 filed Nov. 20, 1986 abandoned.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975 (W.E. Case 53,224) now continuation Ser. No. 180,719 filed Apr. 4, 1988 (W.E. Case 53,224C) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 (W.E. Case 53,225), now continuation Ser. No. 231,627, filed Aug. 5, 1988 (W.E. Case 53,225C) entitled DIGITAL ROBOT CONTROL HAVING AN IMPROVED PULSE WIDTH MODULATOR and filed by Kenneth E. Daggett.

U.S. Ser. No. 932,992 (W.E. Case 53,226) now continuation Ser. No. 180,703 filed Apr. 5, 1988 (W.E. Case 53,226C) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W.E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 (W.E. Case 53,367), now continuation Ser. No. 178,813 filed Apr. 1, 1988 (W.E. Case 53,367C) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,982 (W.E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W.E. Case 53,372) entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 (W.E. Case 53,373) entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W.E. Case 53,374) entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, now continuation Ser. No. 180,601 filed Apr. 6, 1988 (W.E. Case 53,423C) entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 (W.E. Case 53,424), now continuation Ser. No. 180,723 filed Mar. 4, 1988 (W.E. Case 53,424C) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 (W.E. Case 53,489) entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 (W.E. Case 53,490) entitled MULTIAXIS ROBOT CONTROL HAVING CAPABILITY FOR EXECUTING TIMED MOVES and filed by Rajan Penkar.

U.S. Pat. No. 4,772,831 (W.E. Case 53,491) entitled MULTIAXIS ROBOT CONTROL HAVING IMPROVED CONTINUOUS PATH OPERATION and filed by Rajan Penkar.

U.S. Pat. No. 4,773,025 (W.E. Case 53,492) entitled MULTIAXIS ROBOT CONTROL HAVING FITTED CURVED PATH CONTROL and filed by Rajan Penkar.

U.S. Ser. No. 932,973 (W.E. Case 53,493), now continuation Ser. No. 180,598 filed Apr. 6, 1988 (W.E. Case 53,493C) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 (W.E. 53,494) entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to position and velocity feedback systems used in the position and velocity loops in robot controls.

In the operation of robot control systems, individual axis position and velocity parameters are placed under closed loop control. Microprocessors may be employed to make control loop calculations and perform other functions for the robot control. In any case, motor velocity and axis (motor) position signals are required for control loop operation.

Position feedback may be absolute or it may be incremental, and it is the latter type to which the present invention relates. Velocity feedback may be generated by tachometers and/or it may be derived from position feedback as it is in the present case.

The most common type of incremental position feedback encoder is based on optical technology. The optical encoder typically employs optical transmitters and receivers with a rotating disc having transparent slits. Two phase signals and an index signal are generated by the encoder.

The phase signals are offset from each other by 90 degrees in a quadrature encoding scheme such that they can exist in four different states. State transitions enable incremental position change and direction of position change to be detected.

The index signal may occur once every optical disk revolution thereby providing a mechanism for verifying accumulated incremental position change from the two phase signals.

In implementing digital robot control, the amount of digital circuitry required with conventional prior art approaches for conversion of the encoder phase signals to incremental counts for access by a microcomputer is extensive. Moreover, although derivation of velocity from position change is typically acceptable at high velocities, inadequate velocity resolution is achieved at low velocities with conventional conversion circuitry. Better low velocity resolution can be achieved with increased resolution of the encoder, but the extent of improvement through this alternative is limited and in any case results in substantially increased product cost.

SUMMARY OF THE INVENTION

A digital robot control includes an electric motor for driving each of the robot arm joints and a power amplifier operable to supply drive current to each motor. Feedback control loop means are provided for each joint motor, including at least digital position and velocity control loops operable at a predetermined sampling rate to control the associated power amplifier.

Encoder means generate a plurality of signals representing motor position changes, and a digital feedback system responsive to the encoder means provides position and velocity feedback signals for the feedback control means at the predetermined sampling rate. The feedback system includes a circuit having means responsive to the encoder means signals to accumulate a count of increment pulses representing incremental changes in position and operating as the position feedback signal for the feedback control means. The circuit further has means for detecting the elapsed time between successive increment pulses and for computing velocity from the elapsed time and generating the velocity feedback signal for the feedback control means.

DESCRIPTION OF THE PREFERRED EMBODIMENT

Robots—Generally

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

Puma Robot

Figure 1:
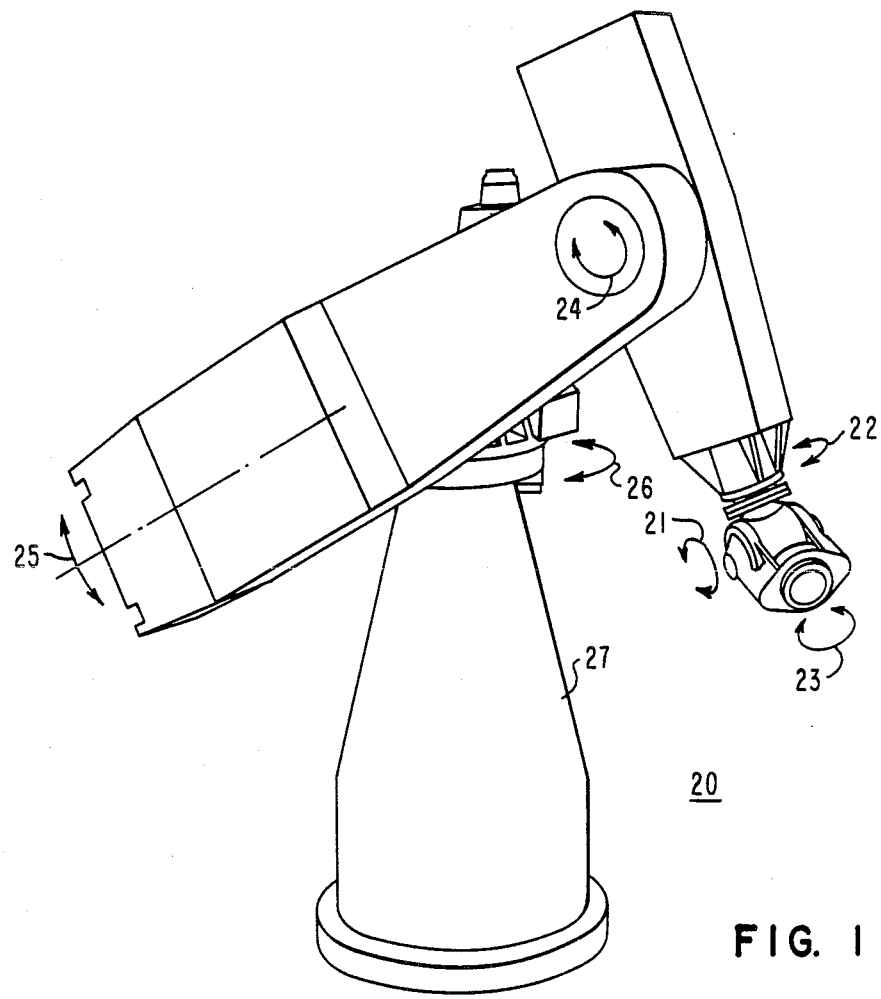
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the robot wrist is provided with three articulations, i.e., an up/down rotation indicated by arrow 21 and a left/right rotation indicated by arrow 22 and a third arm motion indicated by arrow 23. Elbow and shoulder rotations in the up/down direction are respectively indicated by arrows 24 and 25. Finally, a left/right arm rotation on a base 27 is indicated by arrow 26.

Robot Control

The present invention is directed to a robot control 30 (FIGS. 2, 3 or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the UNIVAL control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

Control Loops

Figure 2:
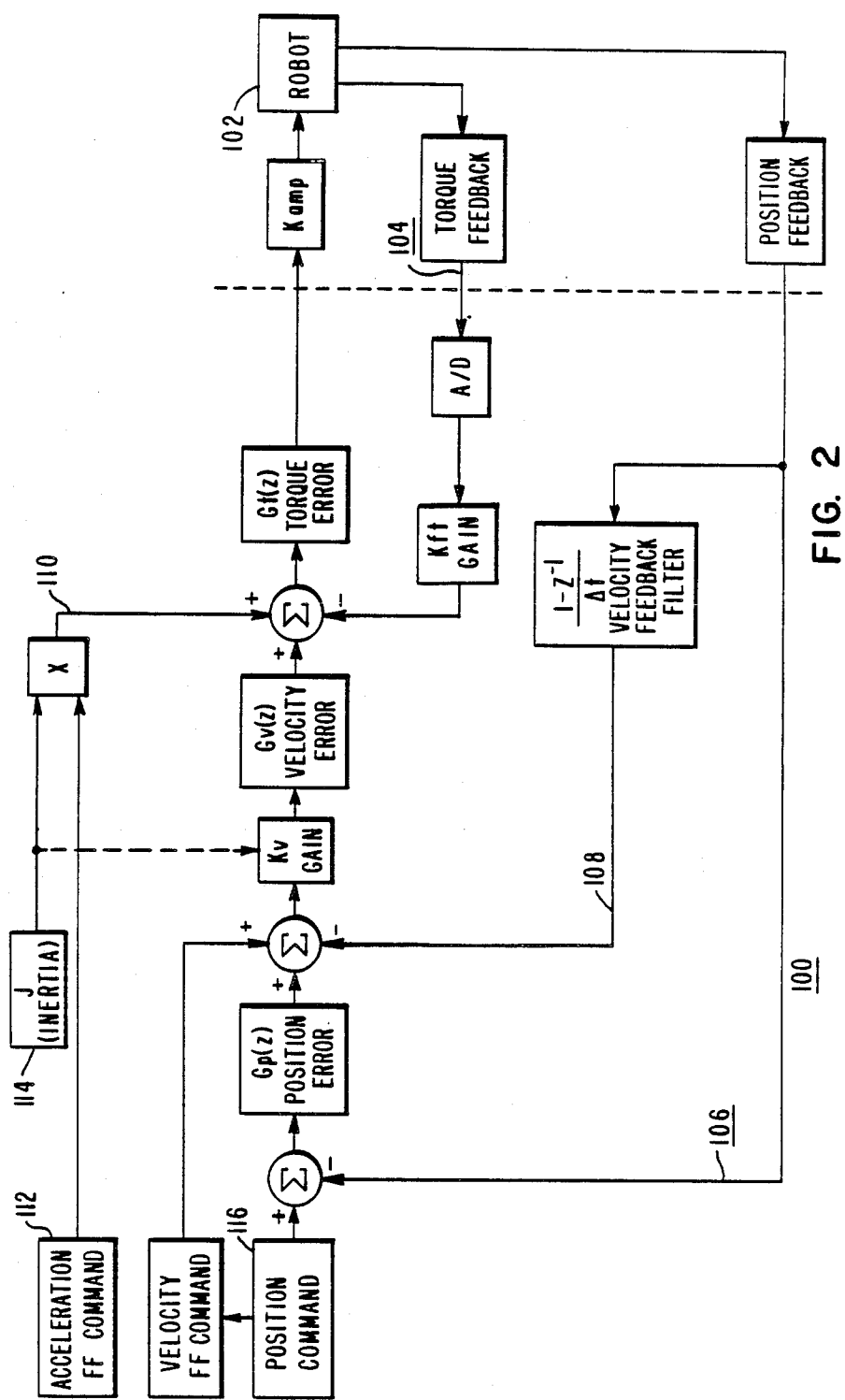
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
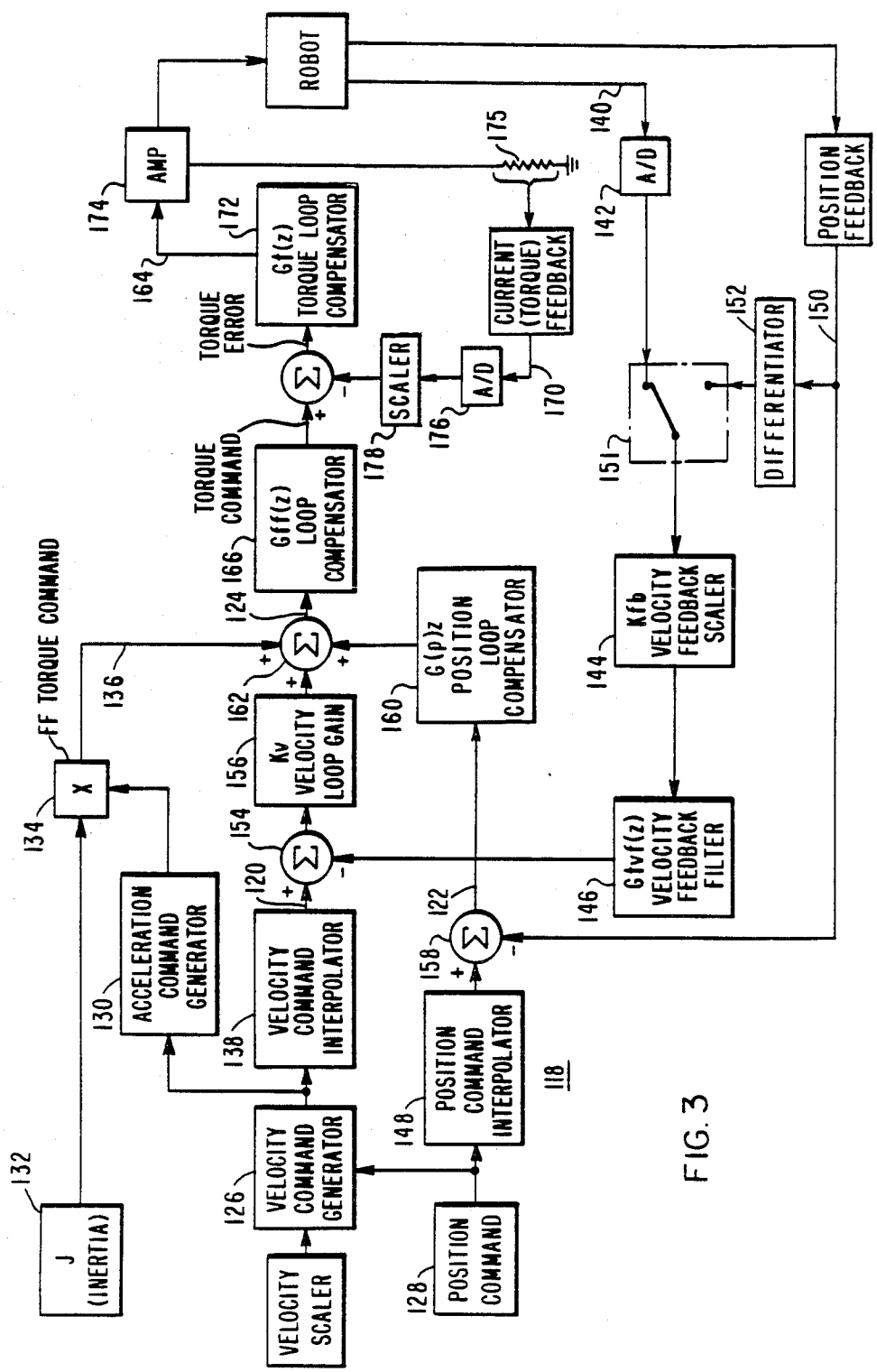
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications W.E. 53,225 and W.E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied to box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse width modulated (PWM) output signals are applied to a power amplifier 174 which supplies the motor drive current for robot joint operation. Current feedback from resistor 175 is sampled every 250 microseconds (see referenced patent application W.E. 53,324) and converted to digital signals by box 176 with scaling applied by box 178.

Overview—Electronic Boards

Figure 4:
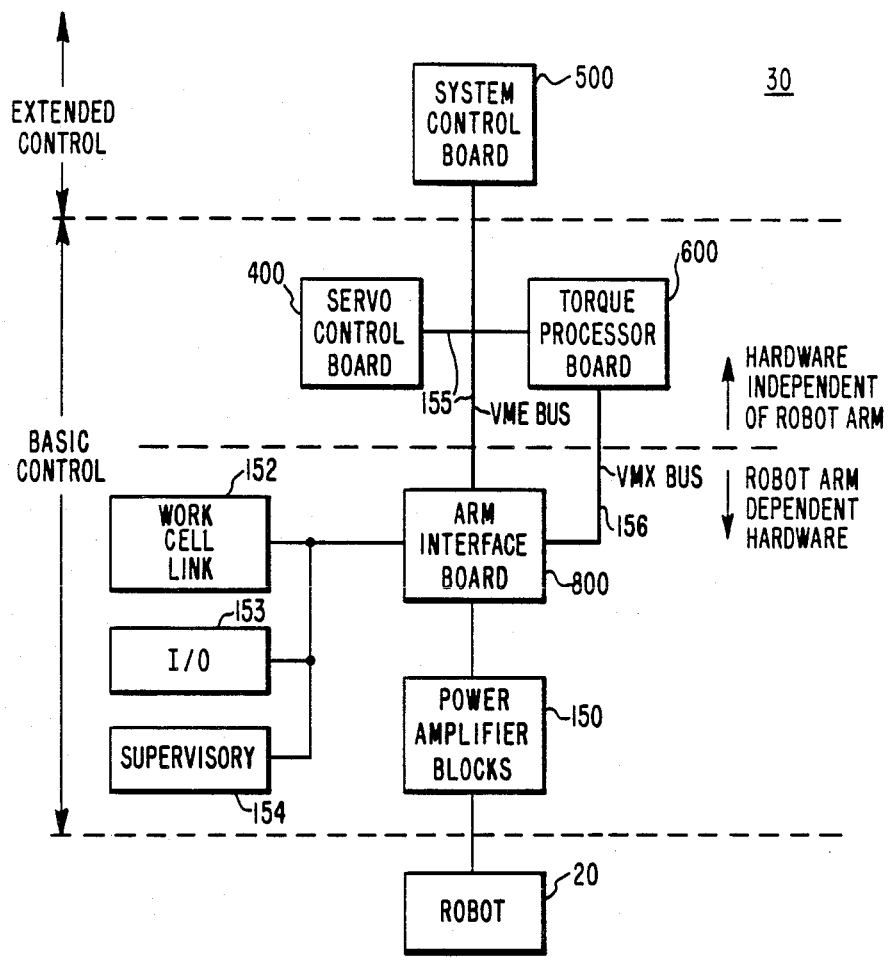
FIG. 4 shows an overview of an arrangement of electronic boards on which circuitry is arranged to implement the robot control system including the pulse width modulation circuitry of the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, the VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented elsewhere in the writeups for the incorporated-by-reference patent applications.

POSITION/VELOCITY FEEDBACK CONTROL LOOP OPERATION

Figure 5:
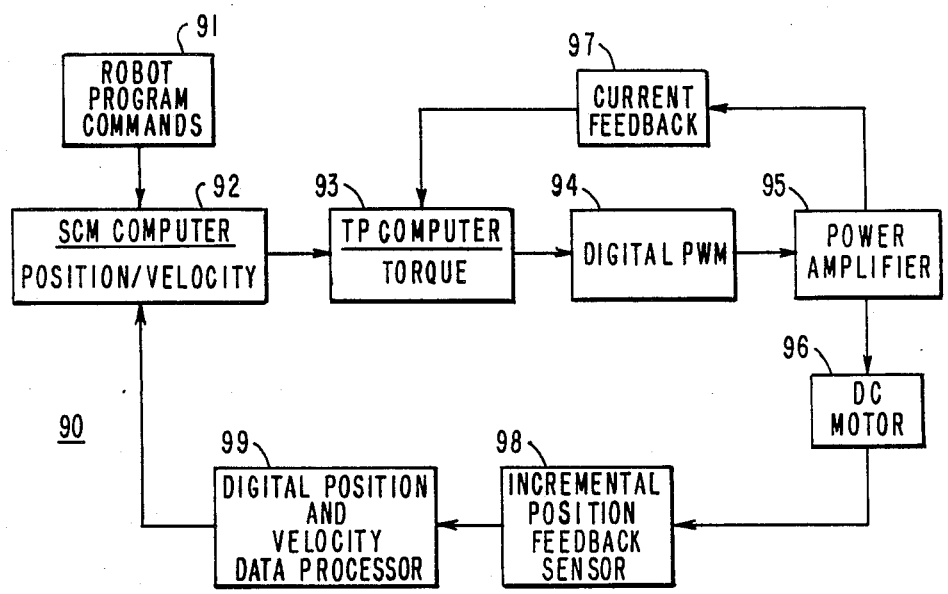
FIG. 5 shows a block diagram of a control loop configuration employing a position and velocity feedback system arranged in accordance with the principles of the invention.

In FIG. 5, there is shown a generalized control loop configuration 90 in which the invention is embodied. Robot commands are generated for each axis by a robot program as indicated by the reference character 91 and applied to a servo control (SCM) computer 92 where position and velocity control is performed.

The SCM computer 92 in turn generates a current or torque command which is applied as a setpoint to a TIP computer 93. A voltage command is applied to a digital pulse width modulator (PWM) 94 from the TP computer 93.

Switch control signals are applied by the PWM to a power amplifier 95 to control the operation of a DC axis motor 96. Closed loop control is enabled by current feedback indicated by the reference character 97 and by position and velocity feedback provided through an incremental optical position feedback sensor 98 and a position and velocity processor 99.

More detail of the structure and operation of the software and circuitry for the configuration of FIG. 5 is set forth in the disclosure for the incorporated-by-reference patent applications.

LSI INCREMENTAL POSITION FEEDBACK PROCESSOR

Figure 6:
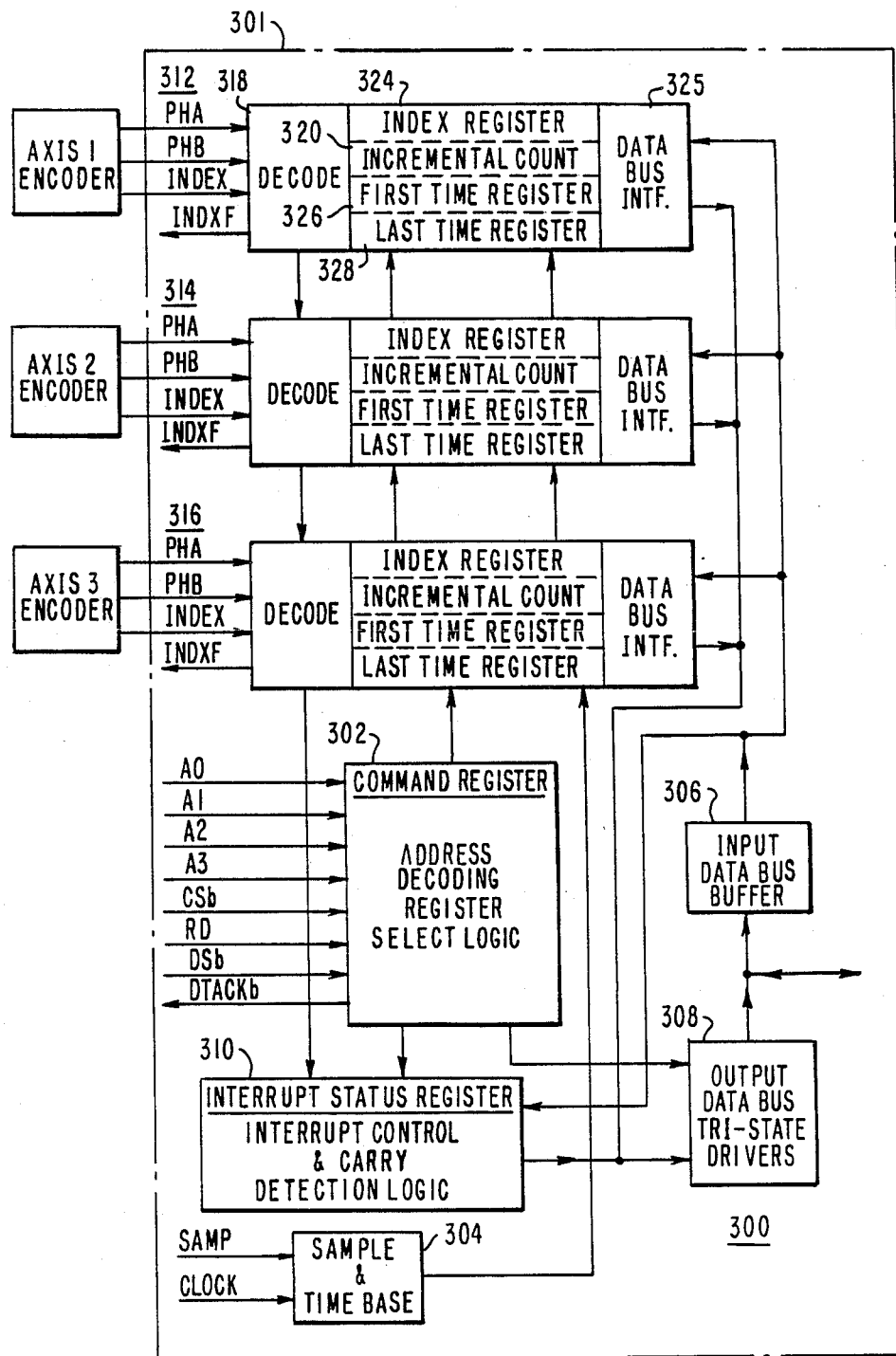
FIG. 6 shows a general block diagram of large scale integrated circuitry employed in FIG. 5 to process encoder signals for three axes and convert them to an incremental position count and provide a basis for deriving more accurate axis velocity.

A block diagram is shown in FIG. 6 for circuitry 300 which is employed to process position encoder feedback and enable robot control to be provided in accordance with the present invention. Encoder interfacing is achieved with improved functionality and greater cost effectiveness through reduced circuitry requirements with use of the present invention.

A command register 302 is included in the circuit 300 to enable a higher level microprocessor to read/write with respect to the circuit 300. As shown, the microprocessor interface signals are as follows:

| Name | Function |
| --- | --- |
| A0-A3 | Address Lines |
| CSb | Chip Select |
| RD | Read |
| DSb | Data Strobe |
| DTACKb | Data Acknowledge |

A sample and time base circuit 304 responds to AIF board signals SAMP and CLOCK to provide cycle reference and time reference signals for registers in the circuit 300. Input and output data bus buffers 306 and 308 provide a data interface for the circuit registers with the VME data bus under microprocessor control. An interrupt status register 310 responds to encoder decode signals and command register signals to generate an interrupt on each index count.

The circuit 300 is organized to process the position feedback encoder signals for three of the six robot axes. Thus, three channels 312, 314 and 316 are provided for decoding and registering position and velocity related data. As shown, each channel includes decode circuitry 318 and data bus interface circuitry 325. Each channel also includes an incremental count register 320 for position counting, an index register 324 for recording encoder index signals, and first and last time registers 326 and 328 employed in the computation of velocity. The output signal INDXF is a logic AND combination of the encoder index signal and the two encoder phase signals.

Figure 7:
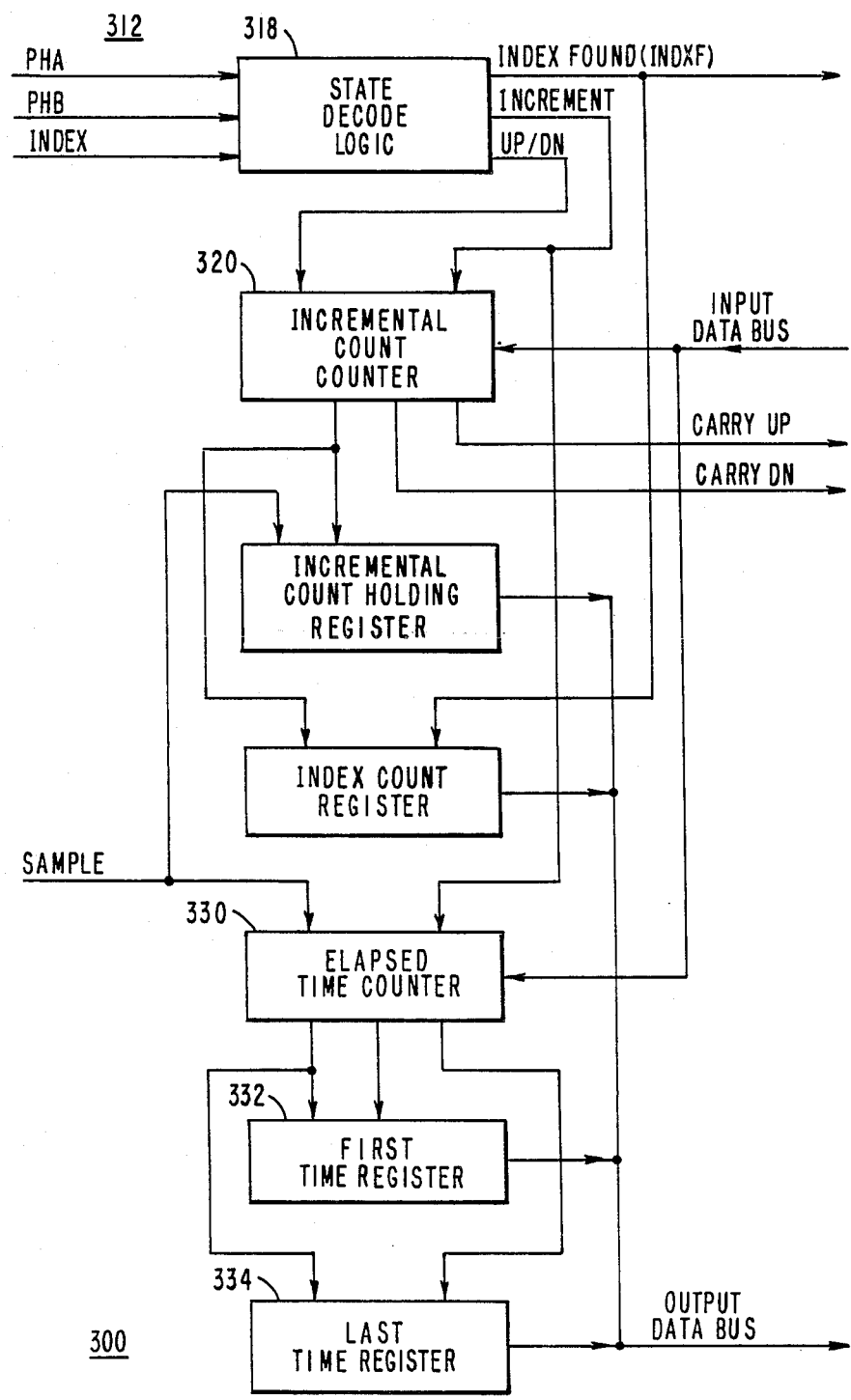
FIG. 7 shows a block diagram more detailed than the diagram of FIG. 6 and it is directed to one of the three axes.
Figure 8A:
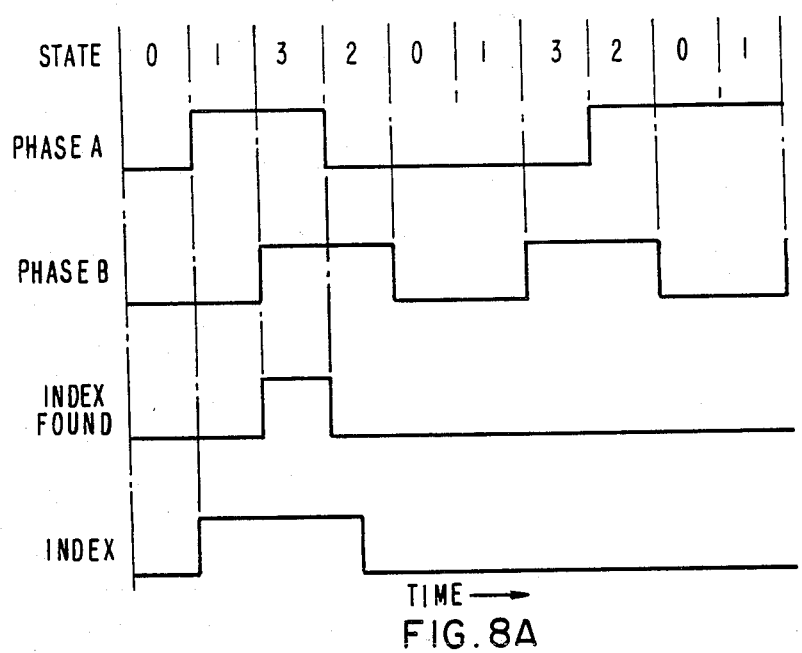
FIG. 8A shows the relationship among the encoder signals, the position increment signals and the velocity related time signals.

As shown in greater detail for the channel 312 in FIG. 7, the decode circuitry 318 is a logic circuit which operates on the three encoder signals PHA, PHB and INDEX to generate the signal INDXF when all three signals coexist and to generate a direction signal UP/DN and position change or INCREMENT signals for the incremental counter 320. FIG. 8A shows the relationship of the encoder signals and the four states which are decoded by the decode circuitry 318.

INDEX occurs once each encoder revolution. Thus, the actual number of counts is compared to the known number of counts per revolution when INDXF occurs. An incorrect number of counts would indicate an error caused for example by noises.

Storing CARRY UP and CARRY DOWN in FIG. 7 effectively doubles the length of the register, i.e., the size of the accumulatable count. An INDEX COUNT REGISTER provides a checking capability to verify the number of INCREMENT counts per revolution.

If the motor speed is so low that only one or two or fewer position change counts are generated each sample period, significant loss occurs in conventional feedback schemes in the accuracy with which velocity can be computed by dividing position change by elapsed time.

With the present invention, improvement is realized through the provision of a capability for determining velocity from position change data with higher resolution at low velocities than has heretofore been achieved. Generally, a measurement is made of the time that occurs between the occurrence of decoded position change pulses. An elapsed time counter 330 generates a cyclic time count under the control of the signal SAMP and detects elapsed time for the generation of the INCREMENT signals.

A first time register 332 records the elapsed time from the beginning of a sample interval to the occurrence of the next INCREMENT pulse. A last time register 334 records the elapsed time between the occurrence of the last INCREMENT pulse in the sample interval to the end of the sample interval.

Figure 9:
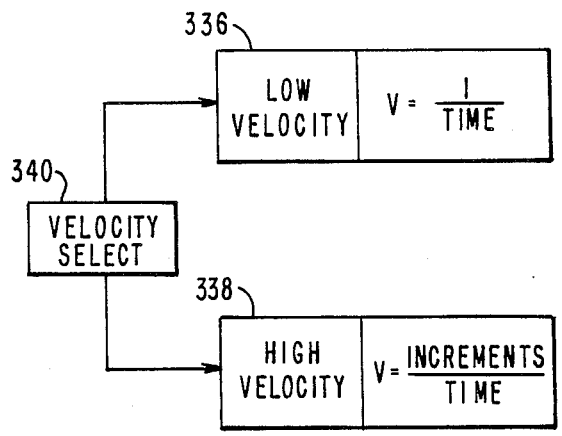
FIG. 9 shows a flow chart which illustrates programming that may be used in controlling the velocity computation method.
Figure 8B:
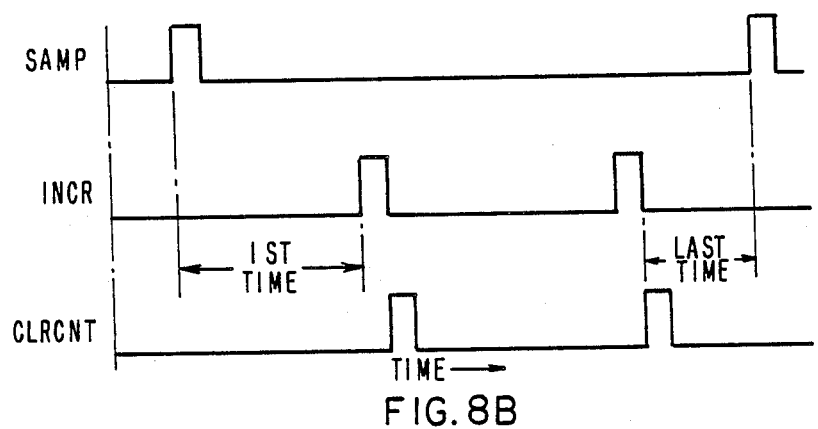
FIG. 8B shows waveforms which illustrate the manner in which velocity is determined from position changes.
Figure 10A:
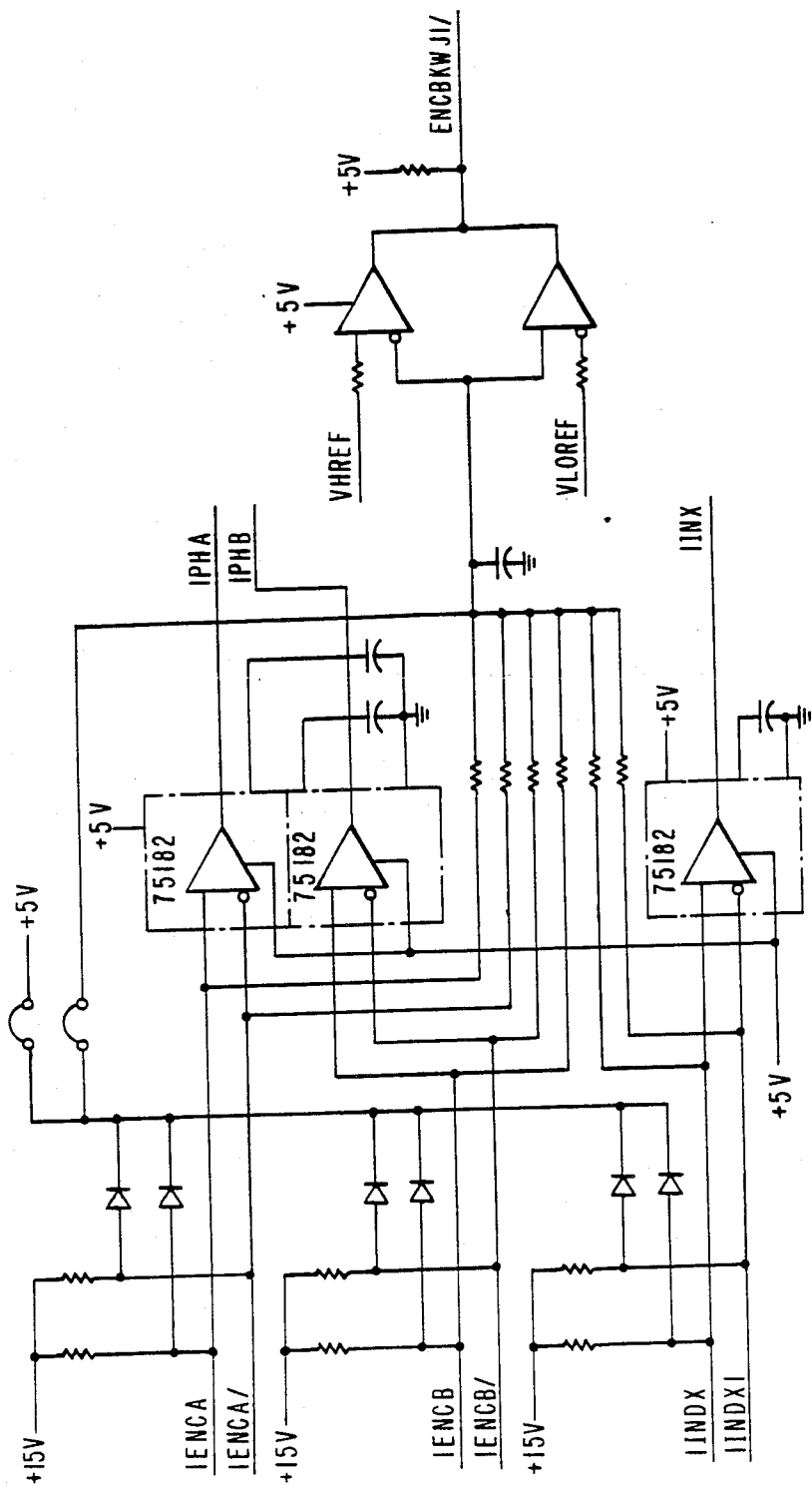
Figure 10B:
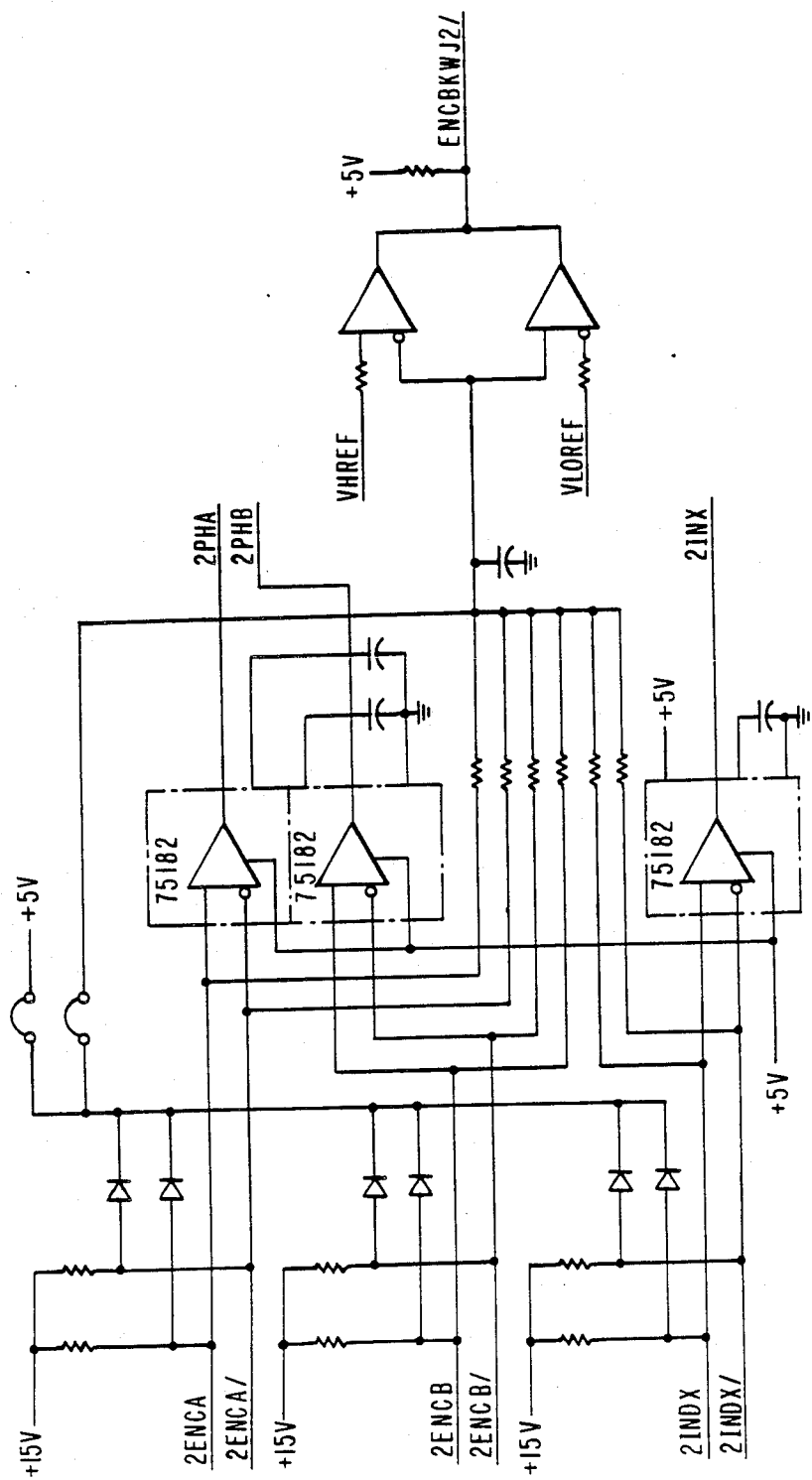
Figure 10C:
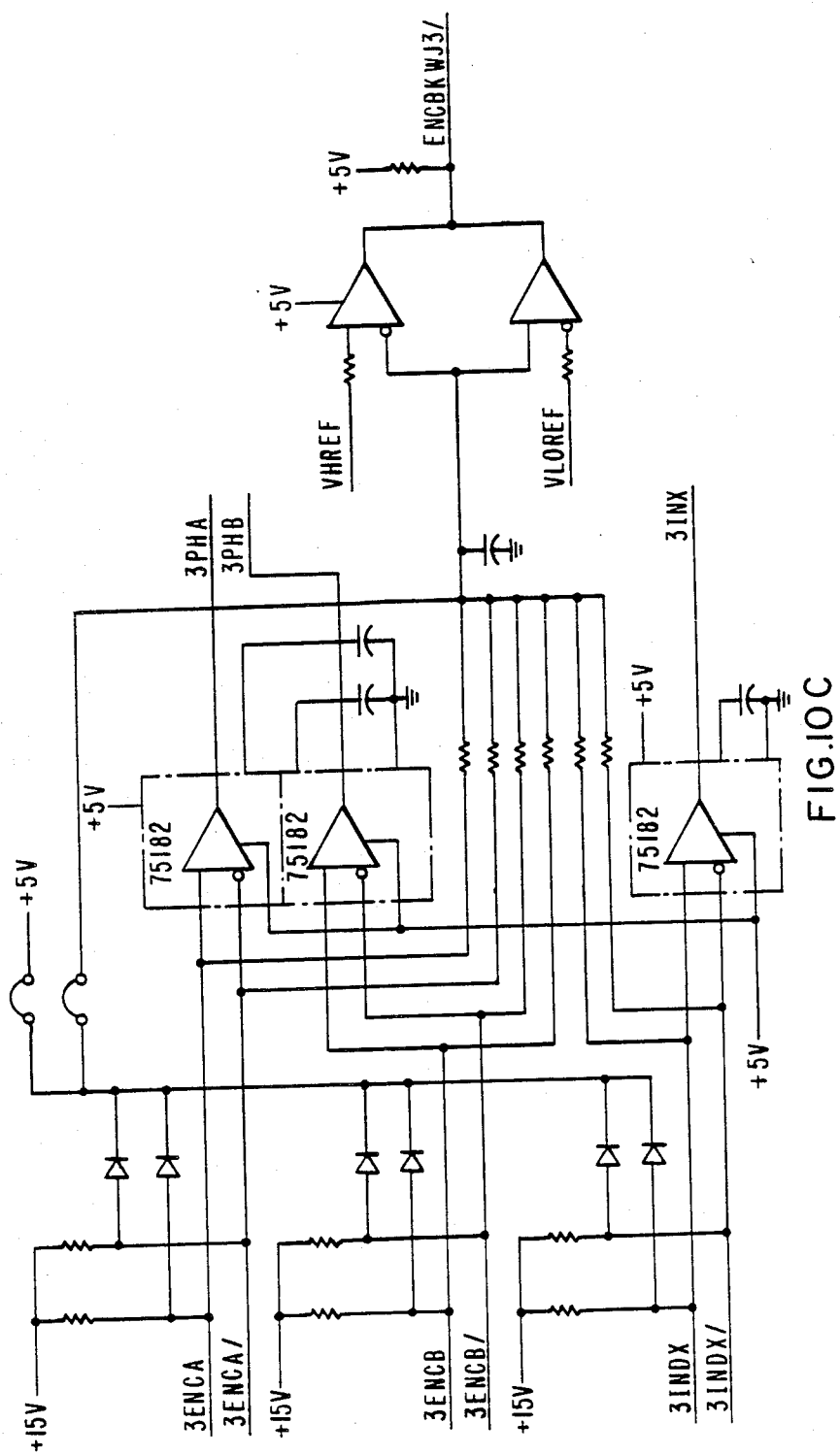
Figure 10D:
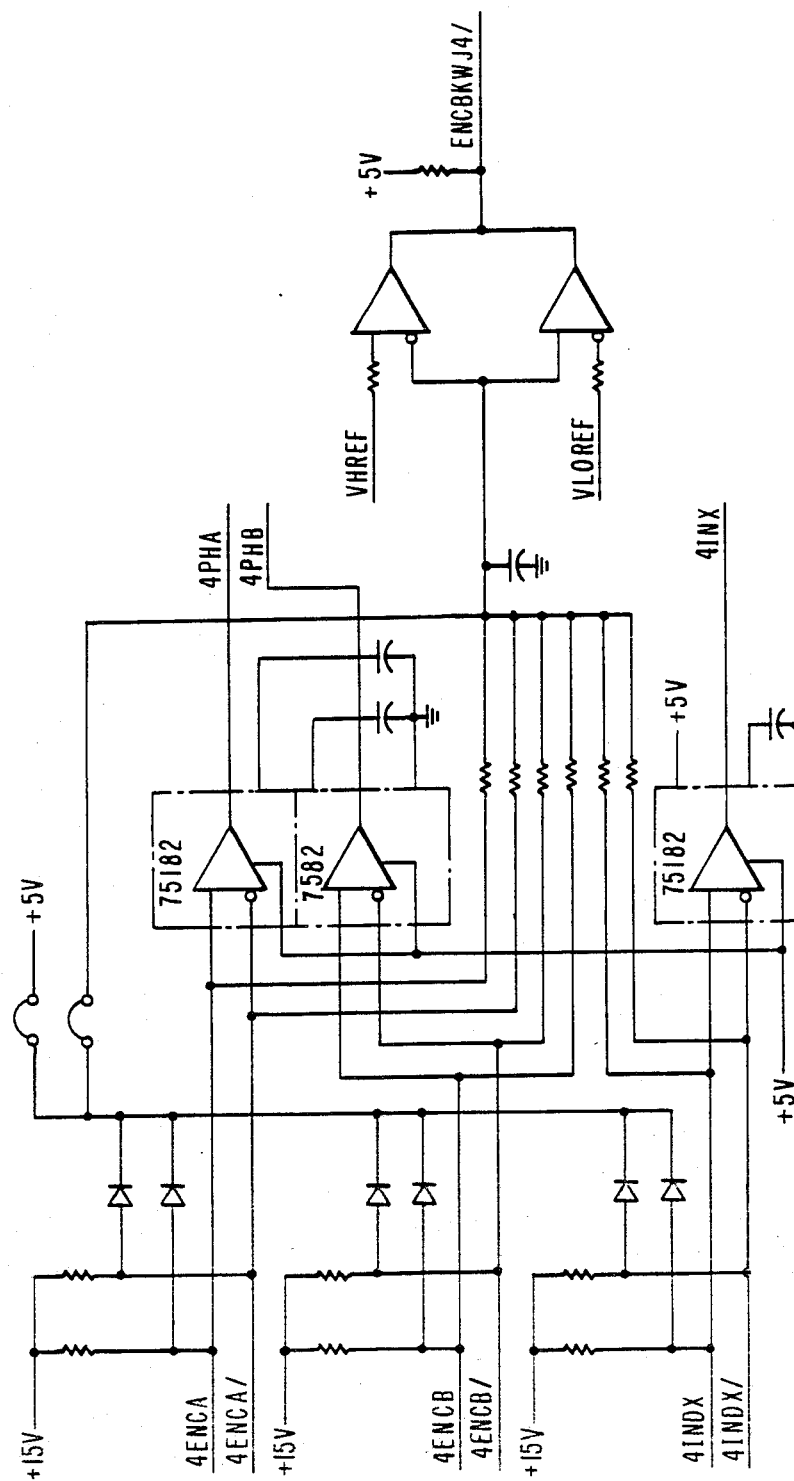
Figure 10E:
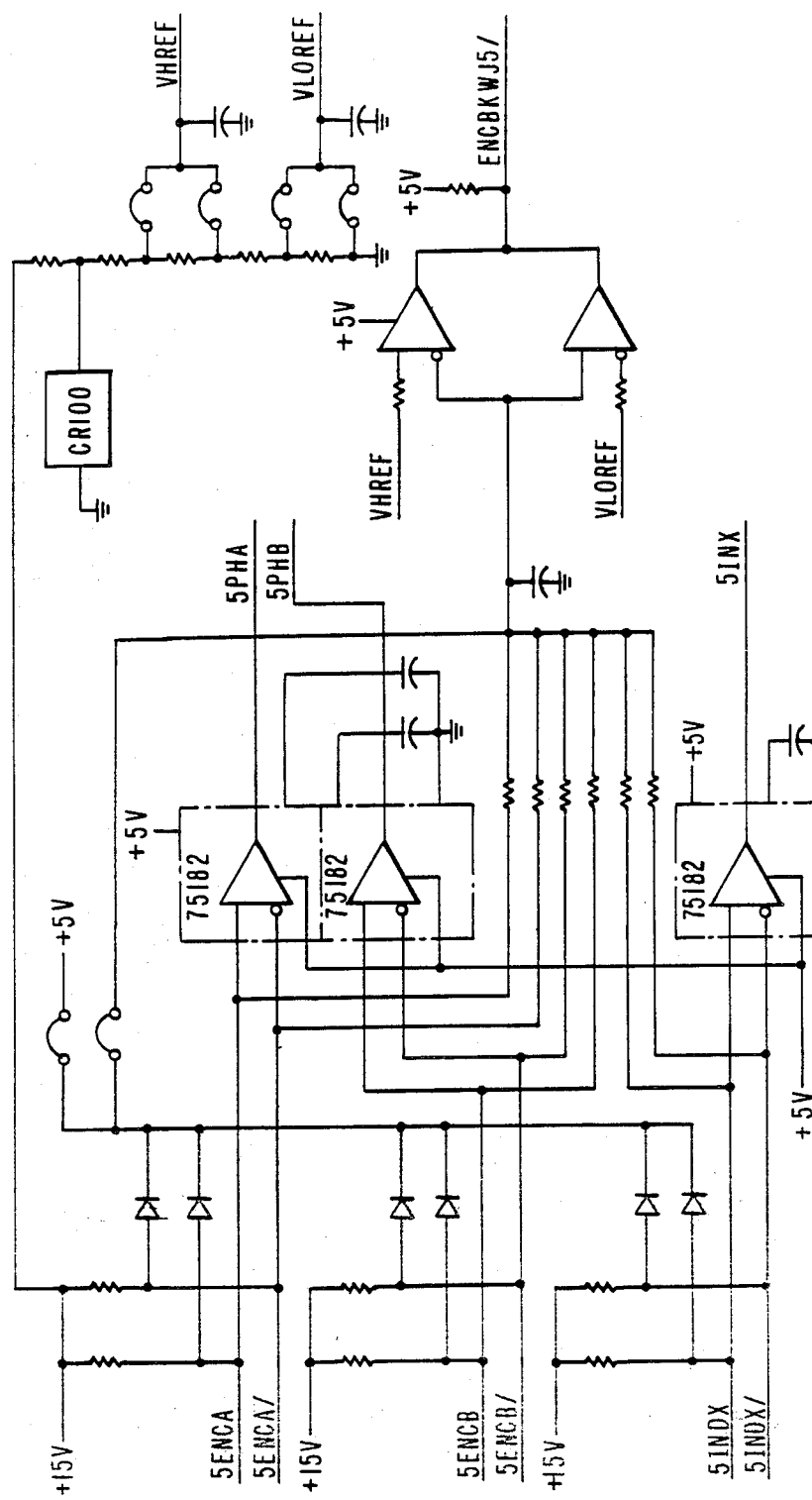
Figures 1, 10F:
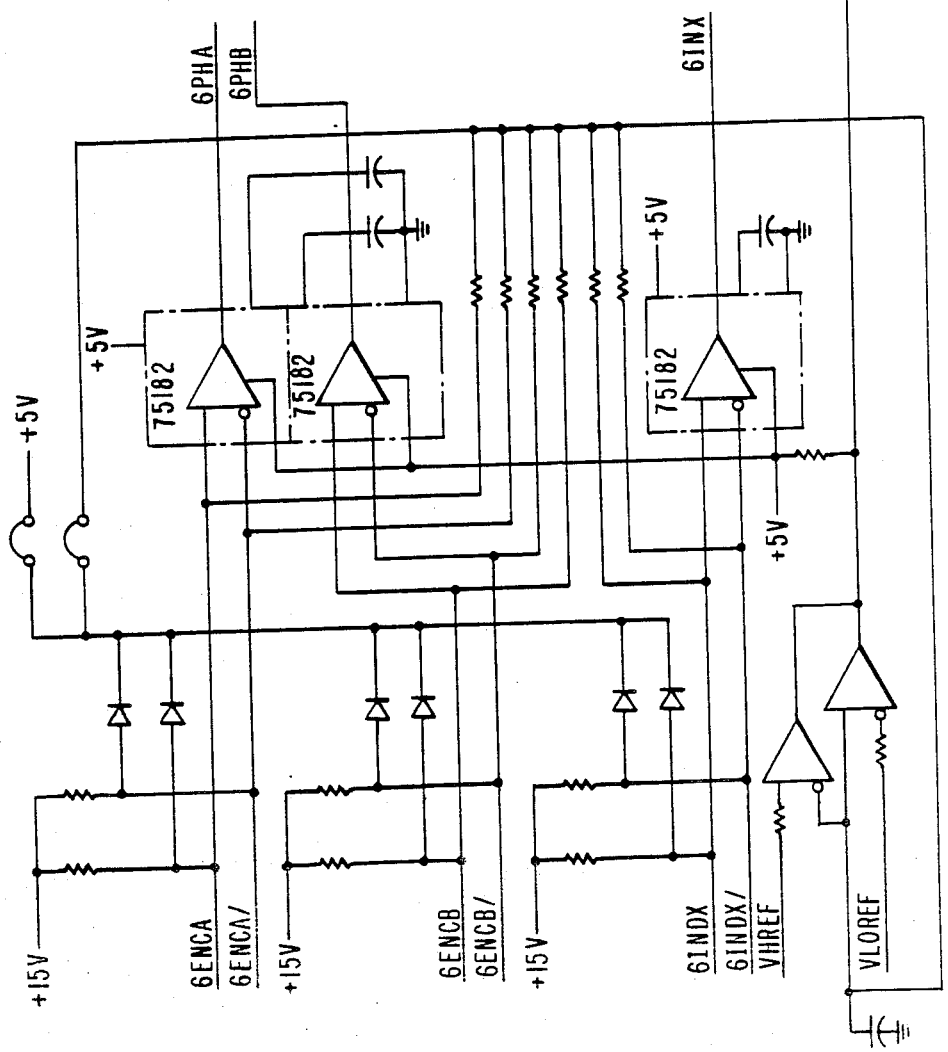
Figures 2, 10F:
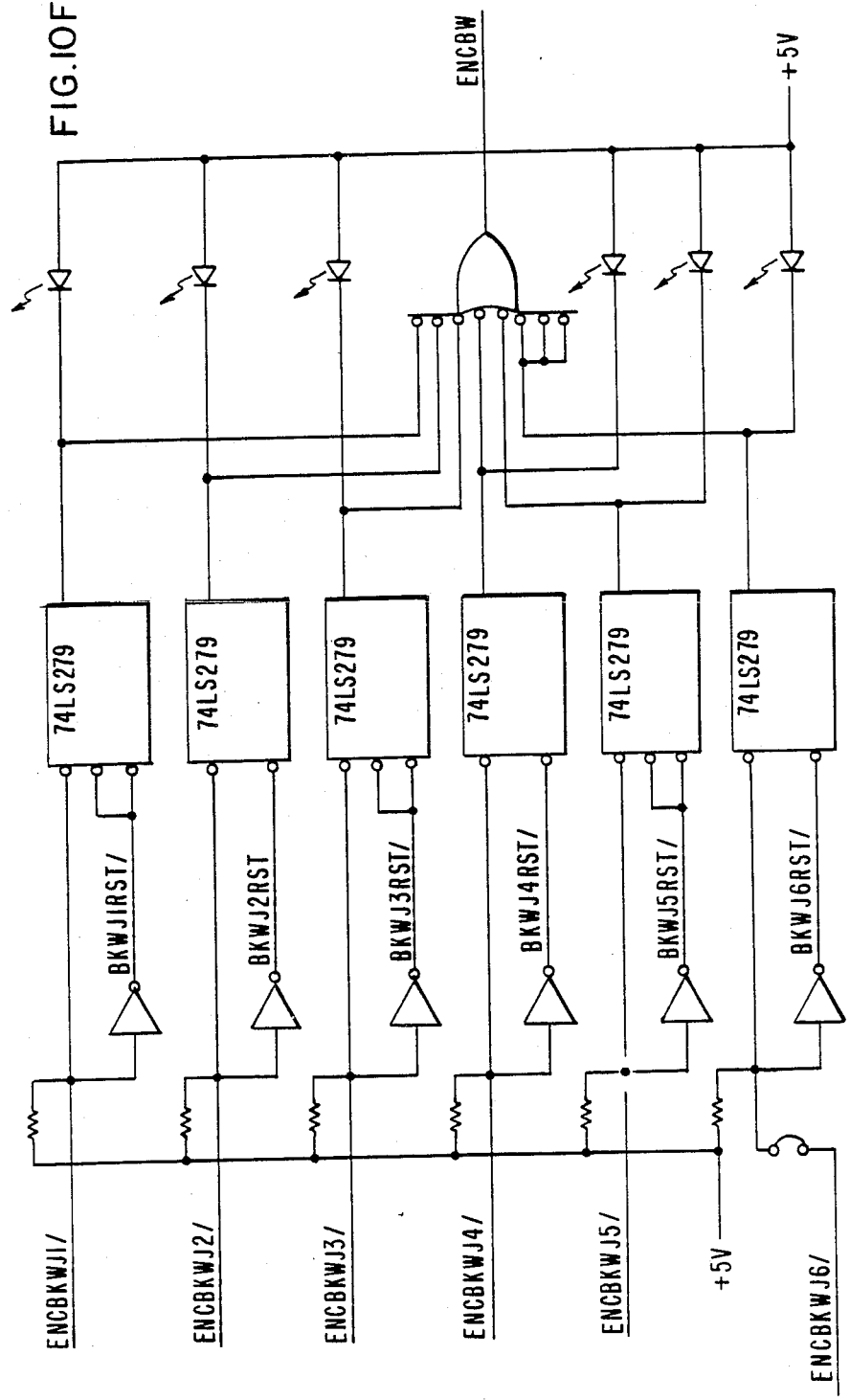
Figures 2, 10G:
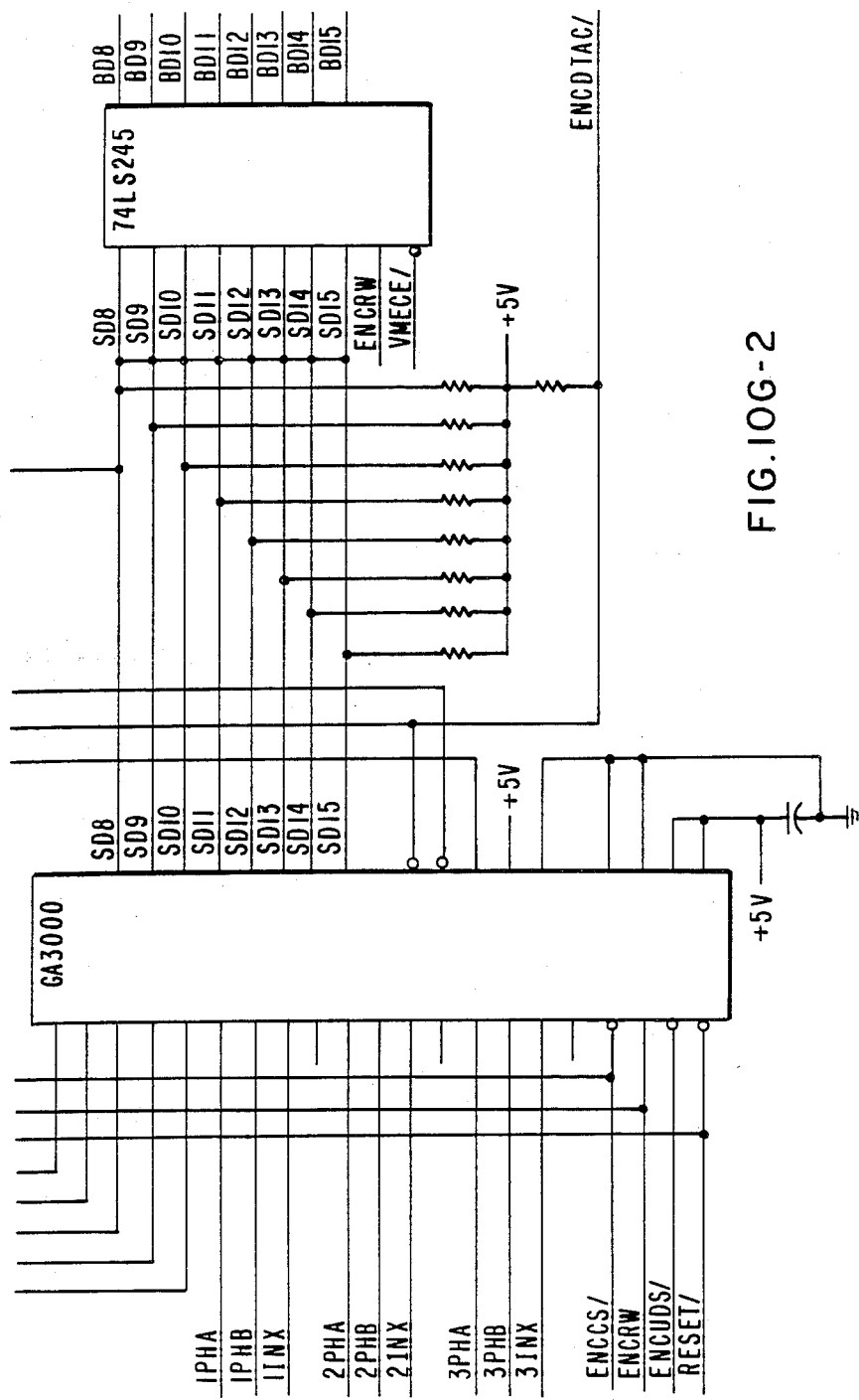

First and last elapsed time signals are transferred to the microprocessor for calculation of velocity accurately reflecting the actual low motor velocity. As indicated by block 336 in the velocity feedback calculation flow chart in FIG. 9 and as illustrated in detail in FIG. 8B, the velocity calculation is made on the basis of the inverse time concept; i.e. velocity is computed using the following algorithm:

$$\text{VELOCITY} = 1/\text{TIME}$$

For higher velocities, the microprocessor calculates velocity as indicated by block 338 by dividing the position change (number of INCREMENT pulses) by the elapsed time (number of cycles). The microprocessor crosses between low and high velocity algorithms as the motor velocity rises or drops, because the low velocity algorithm becomes less accurate as the motor velocity increases with increasing numbers of INCREMENT pulses generated in each sample time period generated in any one sample period. The crossover is performed in select block 340, where for example the high velocity algorithm is selected if the INCREMENT count rate is three or more per sample time period.

The circuit 300 is preferably embodied in an LSI chip as indicated by dotted box 301. Thus, the chip 300 is specially designed from a standard Large Scale Integrated (LSI) gate array chip.

One such chip 300 is used for each set of three robot axes. Thus, in the present case two chip chips are employed on the AIF board which is arranged to operate with the Unimation TM 700 series robots, i.e., with robots having incremental position feedback and employing DC brush type joint motors.

What is claimed is:

1. A digital control for a robot having a plurality of arm joints, said control comprising:

an electric motor constituting a joint motor for driving each of the robot arm joints;

a power amplifier operable to supply drive current to each joint motor;

feedback control loop means for each joint motor including at least digital position and velocity control loops operable at a predetermined sampling rate to control the associated power amplifier;

encoder means for generating a plurality of signals representing joint motor position changes;

a digital feedback system responsive to said encoder means to provide position and velocity feedback signals for said feedback control means at the predetermined sampling rate;

said feedback system including circuit means having means responsive to said encoder means signals to accumulate a count of increment pulses representing incremental changes in position and operating as said position feedback signal for said feedback control means;

said circuit means further having means for detecting the elapsed time between successive increment pulses, the elapsed time being detected by first determining the time interval between the start of a sample pulse and the start of a first increment pulse which occurs before the next sample pulse, and for adding the time interval between the end of the last increment pulse in the sample period and the start of the next sample pulse, which defines the sample period, and then subtracting this time interval summation from the time period between the two sample pulses which define the sample period. and means for computing velocity from the elapsed time and generating said velocity feedback signal for said feedback control means.

2. A robot control as set forth in claim 1 wherein means are provided for computing velocity from the number of increment pulses generated over a reference time period and means are provided for selecting one of the two computed velocities for use as said velocity feedback signal.

3. A robot control as set forth in claim 2 wherein the velocity selection is based on the rate of increment pulse generation with the elapsed time velocity selected for lower velocities and the increment pulse velocity selected for higher velocities.

4. A digital control for a robot having a plurality of arm joints, said control comprising:

an electric motor for driving each of the robot arm joints;

a power amplifier operable to supply drive current to each motor;

feedback control loop means for each motor including at least digital position and velocity control loops operable at a predetermined sampling rate to control the associated power amplifier;

encoder means for generating a plurality of signals representing motor position changes;

a digital feedback system responsive to said encoder means to provide position and velocity feedback signals for said feedback control means at the predetermined sampling rate;

said feedback system including circuit means having means responsive to said encoder means signals to accumulate a count of increment pulses representing incremental changes in position and operating as said position feedback signal for said feedback control means;

said circuit means further having means for cyclically generating a sample pulse synchronized to the predetermined sampling rate of said position and velocity control loops;

means for detecting the time elapsed from the sample pulse marking the beginning of each sample period to the beginning of the first increment pulse in that sample period;

means for detecting the time elapsed from the end of the last increment pulse in each sample period to the sample pulse marking the end of that sample period; and means for computing velocity from the elapsed time between successive last and first increment pulses with respect to each sample period and for generating said velocity feedback signal for said feedback control means.

5. A robot control as set forth in claim 4 wherein means are provided for computing velocity from the number of increment pulses generated over a reference time period and means are provided for selecting one of the two computed velocities for use as said velocity feedback signal.

6. A robot control as set forth in claim 5 wherein the velocity selection is based on the rate of increment pulse generation with the elapsed time velocity selected for lower velocities and the increment pulse velocity selected for higher velocities.

7. A robot comprising:
an arm having a plurality of joints;
each of said joints being driven by an electric motor drive;
a power amplifier operable to supply drive current to each joint drive motor;
feedback control loop means for each joint drive motor including at least digital position and velocity control loops operable at a predetermined sampling rate to control the associated power amplifier;
encoder means for generating a plurality of signals representing motor position changes;
a digital feedback system responsive to said encoder means to provide position and velocity feedback signals for said feedback control means at the predetermined sampling rate;
said feedback system including circuit means having means responsive to said encoder means signals to accumulate a count of increment pulses representing incremental changes in position and operating as said position feedback signal for said feedback control means;
said circuit means further having means for detecting the elapsed time between successive increment pulses relative to a sample period and for computing velocity from the elapsed time and generating said velocity feedback signal for said feedback control means.

8. A robot as set forth in claim 7 wherein means are provided for computing velocity from the number of increment pulses generated over a reference time period and means are provided for selecting one of the two computed velocities for use as said velocity feedback signal.

9. A robot as set forth in claim 8 wherein the velocity selection is based on the rate of increment pulse generation with the elapsed time velocity selected for lower velocities and the increment pulse velocity selected for higher velocities.

10. A digital position and velocity feedback system for a digital control for a robot having a plurality of arm joints, said system comprising:
an electric motor for driving each of the robot arm joints in accordance with operation of the digital control;
encoder means for generating a plurality of signals representing motor position changes;
first circuit means responsive to said encoder means signals to accumulate a count of increment pulses representing incremental changes in position and operating as a position feedback signal;
said first circuit means further having means for detecting the elapsed time between successive increment pulses relative to a sample period and for computing velocity from the elapsed time and generating a velocity feedback signal.

11. A system as set forth in claim 10 wherein means are provided for computing velocity from the number of increment pulses generated over a reference time period and means are provided for selecting one of the two computed velocities for use as said velocity feedback signal.

12. A system as set forth in claim 11 wherein the velocity selection is based on the rate of increment pulse generation with the elapsed time velocity selected for lower velocities and the increment pulse velocity selected for higher velocities.

13. A system as set forth in claim 10 wherein a large scale integrated gate array chip is structured to embody said first circuit means.

14. A digital position and velocity feedback system for a digital control for a robot having a plurality of arm joints, said system comprising:
an electric motor for driving each of the robot arm joints in accordance with operation of the digital control;
encoder means for generating a plurality of signals representing motor position changes;
circuit means responsive to said encoder means signals to accumulate a count of increment pulses representing incremental changes in position and operating as a position feedback signal;
said circuit means further having means for detecting the elapsed time between successive increment pulses relative to a sample period and for computing velocity from the elapsed time and generating a velocity feedback signal;
said circuit means further having means for cyclically generating a sample pulse synchronized to the predetermined sampling rate of said position and velocity control loops;
means for detecting the time elapsed from the sample pulse marking the beginning of each sample period to the beginning of the first increment pulse in that sample period;
means for detecting the time elapsed from the end of the last increment pulse in each sample period to the sample pulse marking the end of that sample period.

15. A system as set forth in claim 10 wherein:
said first circuit means further includes second circuit means having means for cyclically generating a sample pulse synchronized to the predetermined sampling rate of said position and velocity control loops;
means for detecting the time elapsed from the sample pulse marking the beginning of each sample period to the beginning of the first increment pulse in that sample period;

means for detecting the time elapsed from the end of the last increment pulse in each sample period to the sample pulse marking the end of that sample period; and means for computing velocity from the elapsed time between successive last and first increment pulses and for generating said velocity feedback signal for said feedback control means.

16. A system as set forth in claim 15 wherein a large scale integrated gate array chip is structured to embody said second circuit means.

* * * * *